US008289986B2

United States Patent
Park et al.

(10) Patent No.: US 8,289,986 B2
(45) Date of Patent: Oct. 16, 2012

(54) SELF-ORGANIZING RESOURCE ACCESS APPARATUS AND METHOD IN LOCAL AREA NETWORK COMMUNICATION ENVIRONMENT

(75) Inventors: Seung-Hoon Park, Seoul (KR); Eun-Tae Won, Seoul (KR); Dae-Seok Kim, Seoul (KR); Chi-Hong Cho, Suwon-si (KR); Noh-Gyoung Kang, Seoul (KR); Do-Young Kim, Yongin-si (KR); Joon-Ho Park, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 220 days.

(21) Appl. No.: 12/557,106

(22) Filed: Sep. 10, 2009

(65) Prior Publication Data

US 2010/0061395 A1 Mar. 11, 2010

(30) Foreign Application Priority Data

Sep. 10, 2008 (KR) .................. 10-2008-0089233
Nov. 28, 2008 (KR) .................. 10-2008-0119660

(51) Int. Cl.
*H04J 3/16* (2006.01)
(52) U.S. Cl. .................................. 370/437

(58) Field of Classification Search ............ 370/437
See application file for complete search history.

(56) References Cited

U.S. PATENT DOCUMENTS

| 5,265,094 | A | * | 11/1993 | Schmickler et al. | 370/447 |
| 6,584,080 | B1 | * | 6/2003 | Ganz et al. | 370/315 |
| 2005/0175026 | A1 | * | 8/2005 | Ayyagari | 370/443 |
| 2005/0190796 | A1 | * | 9/2005 | Date et al. | 370/503 |
| 2006/0114841 | A1 | * | 6/2006 | Date et al. | 370/254 |

* cited by examiner

*Primary Examiner* — Anh-Vu Ly
*Assistant Examiner* — Maharishi Khirodhar
(74) *Attorney, Agent, or Firm* — The Farrell Law Firm, P.C.

(57) ABSTRACT

A self-organizing resource access method is provided for transmitting data by self-organizing resource access by each individual node in a Local Area Network (LAN) communication environment where at least two nodes exchange data with each other. A first node listens to at least one data transmission of at least one other node connected to the LAN, and adjusts a data transmission start time of the first node in accordance with a data transmission start time of the at least one other node so that the data transmission start time of the first node does not overlap the data transmission start time of the at least one other node. The first node transmits data to the at least one other node at the adjusted data transmission start time.

19 Claims, 16 Drawing Sheets

SELF-ORGANIZING RESOURCE ACCESS APPARATUS AND METHOD IN LOCAL AREA NETWORK COMMUNICATION ENVIRONMENT

PRIORITY

This application claims priority under 35 U.S.C. §119(a) to a Korean Patent Application filed in the Korean Intellectual Property Office on Sep. 10, 2008 and assigned Serial No. 10-2008-0089233, and to a Korean Patent Application filed in the Korean Intellectual Property Office on Nov. 28, 2008 and assigned Serial No. 10-2008-0119660, the disclosures of which are incorporated herein by reference.

BACKGROUND OF THE INVENTION

1. Field of the Invention

The present invention relates generally to communication resource access in a communication system, and more particularly, to a resource access apparatus and method for peripheral devices and sensors that use short-range communication.

2. Description of the Related Art

Commonly used short-range communication includes technology such as BLUETOOTH® (hereinafter "Bluetooth"), Zigbee, Body Area Network (BAN), etc. Unlike cellular communication, short-range communication has difficulty implementing complicated Medium Access Control (MAC) algorithms. Therefore, it is important to design a system that is as simple as possible, but one that can attain its desired purposes. For example, BAN may implement a system that has a very small coverage area and which consumes an ultra-low amount of power.

Bluetooth basically uses Time Division Multiple Access (TDMA) that allocates time-divided slots to a master node and a plurality of slave nodes. One slot has a time interval length of 625 microseconds ($\mu$sec). Odd slots are allocated to the master node, and even slots are allocated to the slave nodes. In order to support the plurality of slave nodes, Bluetooth forms 79 1-MHz channels in a frequency band, and hops to other channels at every slot in order to reduce a collision probability between the slave nodes. However, due to the fact that frequent channel hopping increases power consumption, Bluetooth is unsuitable in a power-limited environment, such as sensors. When supporting a plurality of nodes having different traffic requirements, a fixed TDMA allocation scheme may generate empty slots. However, if a variable TDMA allocation scheme is used to reduce the empty slots, a control signal load may increase.

Zigbee provides a low-cost communication system for wireless access in an environment where limited power and low data rates are used. Zigbee provides TDMA-based Guaranteed Time Slot (GTS) and Carrier Sensing Multiple Access/Collision Avoidance (CSMA/CA) as its channel access scheme. GTS supplements the shortcoming of CSMA/CA and provides a Quality-of-Service (QoS) guarantee for real-time data traffic. However, Zigbee must undergo a GTS request process for a master node, and must provide information on the number of GTS allocation nodes and information on allocated slots at every super frame. When the number of slave nodes frequently changes, the slave nodes are different from each other in terms of required rates, or the slave nodes require variable rates rather than fixed rates, system performance by GTS allocation may decrease. CSMA/CA has superior extensibility regarding the number of nodes and a traffic load. However, CSMA/CA also has poor time resource efficiency because transmission is performed after a lapse of Inter Frame Spacing (IFS) and a waiting time of a predetermined number of slots when it senses (or listens to) transmissions of other nodes for collision prevention.

BAN is under standardization as an international standard, Institute of Electrical and Electronic Engineers (IEEE) 802.15.6 TG6 BAN. BAN may be used in the field of medical services, such as remote diagnosis within two meters from the human body over a communication network. Further, BAN may be used in the field of entertainment services that use wearable equipment or motion sensors for wearable computing. However, both TDMA and CSMA/CA fail to meet ultra-low power requirements while also supporting various services and ensuring adaptation to changes in environment.

SUMMARY OF THE INVENTION

The present invention has been made to address at least the above problems and/or disadvantages and to provide at least the advantages described below. Accordingly, an aspect of the present invention provides an efficient and simple resource access apparatus and method that is suitable for a BAN environment.

Another aspect of the present invention provides an apparatus and method in which respective slave nodes perform the same operation rule using a self-organizing theory without centralized control by a master node, thereby fairly accessing resources without transmission collision.

According to one aspect of the present invention, a self-organizing resource access method is provided for transmitting data by self-organizing resource access by each individual node in a Local Area Network (LAN) communication environment where at least two nodes exchange data with each other. A first node listens to at least one data transmission of at least one other node connected to the LAN. The first node adjusts a data transmission start time of the first node in accordance with a data transmission start time of the at least one other node so that the data transmission start time of the first node does not overlap the data transmission start time of the at least one other node. The first node transmits data to the at least one other node at the adjusted data transmission start time.

According to another aspect of the present invention, a self-organizing resource access apparatus is provided for transmitting data by self-organizing resource access by each individual node in a Local Area Network (LAN) communication environment where at least two nodes exchange data with each other. The apparatus includes an input/output unit for transmitting and receiving data, a modulator for converting data to be sent into a transmittable signal, and a demodulator for converting a received signal into receivable data. The apparatus also includes a phase control unit for controlling a first node to listen to at least one data transmission of at least one other node connected to the LAN, and adjust a data transmission start time of the first node in accordance with a data transmission start time of the at least one other node so that the data transmission start time of the first node does not overlap the data transmission start time of the at least one other node. The phase control unit transmits the data to be sent to the at least one other node through the input/output unit at the adjusted data transmission start time.

According to a further aspect of the present invention, a self-organizing resource access system is provided for transmitting data by self-organizing resource access by each individual node in a Local Area Network (LAN) communication environment where at least two nodes exchange data with each other. The system includes at least one first node for listening to at least one data transmission of at least one second node that entered the LAN, and adjusting a data transmission start time of the at least one first node in accordance with a data transmission start time of the at least one second node. The system also includes the at least one second node for listening to at least one data transmission of the at least one first node and adjusting the data transmission start time of the at least one second node in accordance with the data transmission start time of the at least one first node.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION OF EMBODIMENTS OF THE PRESENT INVENTION

Figure 1:
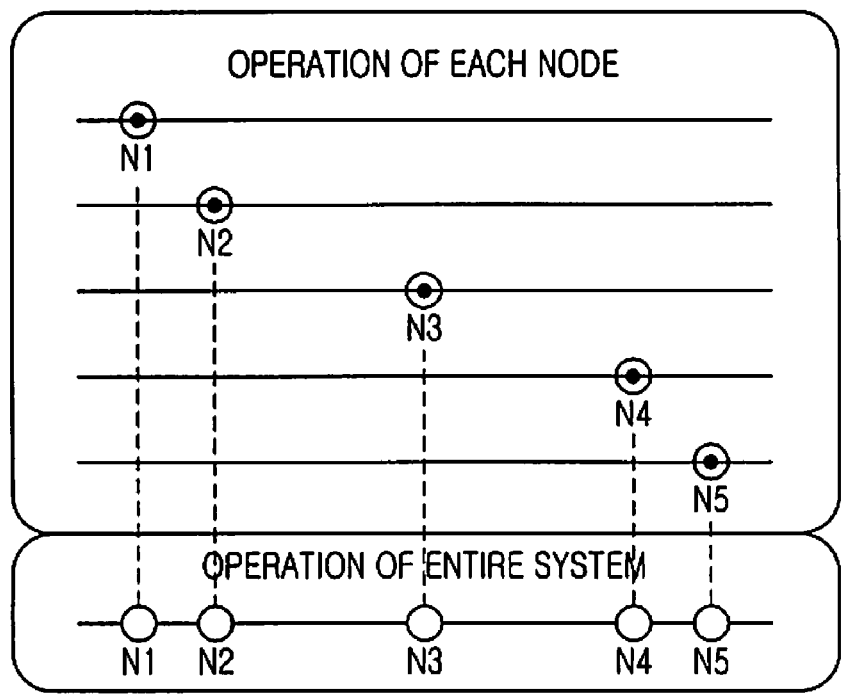
FIG. 1 is a diagram illustrating self-organizing resource management, according to an embodiment of the present invention.
Figure 1:
Figure 1:
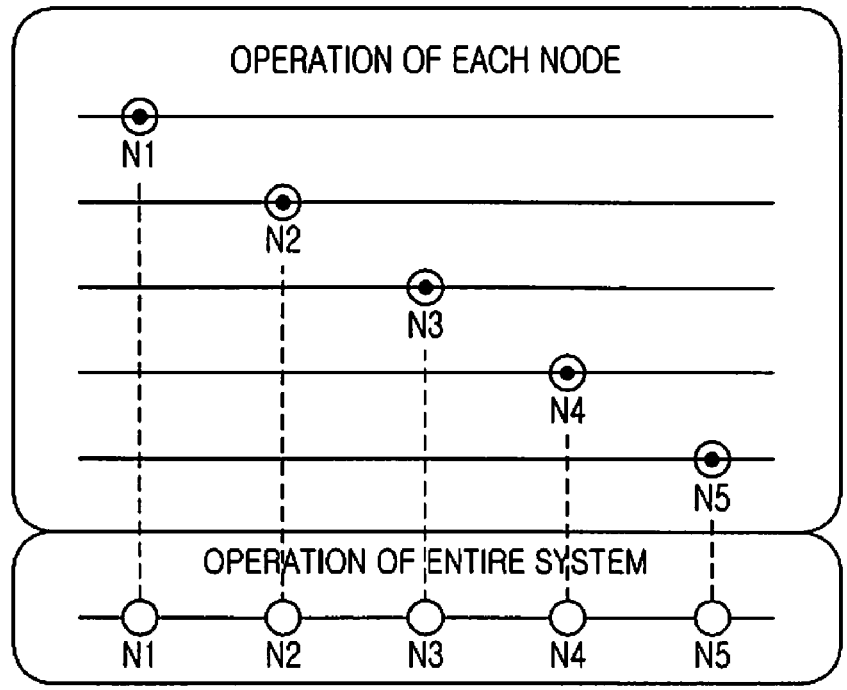

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Referring initially to FIG. 1, a diagram illustrates performance of self-organizing resource management, according to an embodiment of the present invention. A situation is considered in which five nodes, N1 to N5, access resources, as illustrated in FIG. 1. The nodes first access the resources randomly, but after a lapse of time they access the resources such that time resources are uniformly divided.

Referring to FIG. 1, the nodes N1 to N5 each have their own individual operation rules. Such operation rules are performed without information for all variables in accordance with a self-organizing theory. For example, for resource access, each node uniformly divides an entire time period by a total number of nodes without information about the number of nodes that intend to access resources. This is referred to as self-organizing resource access. Due to the fact that all variables are not necessarily controlled by a master node and/or are not necessarily known to each node, the self-organizing resource access can advantageously prevent an efficiency reduction caused by a control process. Each of the nodes includes a phase control unit for controlling a phase in order to operate at predetermined periods. The phase control unit is described in greater detail below.

Figure 2:
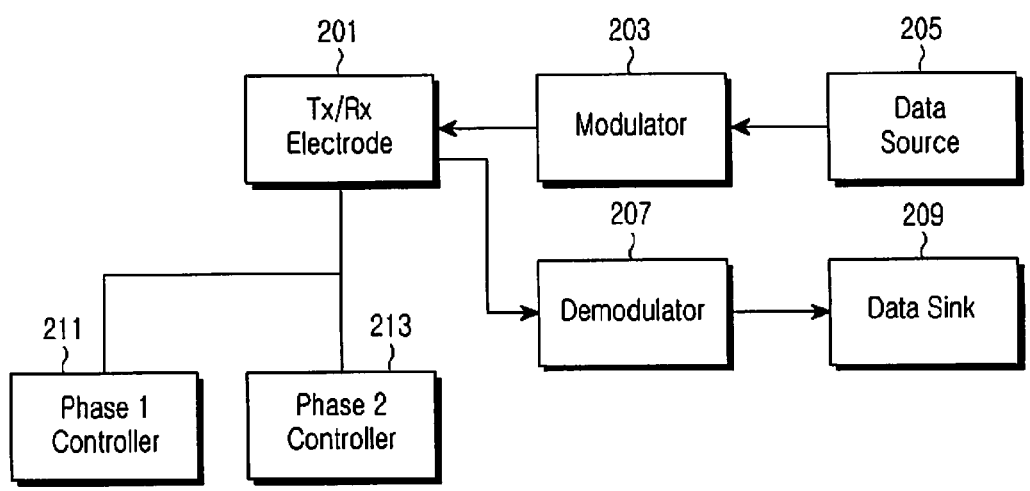
FIG. 2 is a block diagram illustrating implementation of self-organizing resource allocation in LAN communications, according to an embodiment of the present invention.

FIG. 2 is a block diagram illustrating implementation of self-organizing resource allocation in LAN communications, according to an embodiment of the present invention. In an embodiment of the present invention, a short-range communication environment, such as Human Body Communication (HBC), is considered in which every node can recognize (or listen to) transmission of all other nodes with a relatively high probability.

The block diagram of FIG. 2 includes Transmit/Receive (Tx/Rx) electrodes (or input/output unit) 201, a data source 205, a modulator 203, a demodulator 207, a data sink 209, and one or more phase controllers 211 and 213. The phase controllers can vary in number according to their structural characteristics, and may be replaced with oscillators. In an embodiment of the present invention, two phase controllers are used by way of example only.

Data to be transmitted is converted into a transmittable signal by the modulator 203, and then transmitted through a Tx electrode (or output unit) of the Tx/Rx electrodes 201. The first and second phase controllers 211 and 213 extract phase values of their node and reception start times of other nodes at a data transmission start time. The first and second phase controllers 211 and 213 also adjust reception time intervals between the node and the other nodes until the next transmission. The extracted reception start times of the other nodes are received at an Rx electrode (or input unit) of the Tx/Rx electrodes 201. The received signals are converted into identifiable data by the demodulator 207 and then provided to the data sink 209. Thereafter, the data sink 209 utilizes the data in synchronization with a data synch. The data was acquired by reading the data stored in the data source 205, and the Tx/Rx electrodes 201 may serve as transmit/receive antennas for wireless communication. A method how each node performs self-organizing resource management with use of the above-described structure is described in greater detail below.

Figure 3:
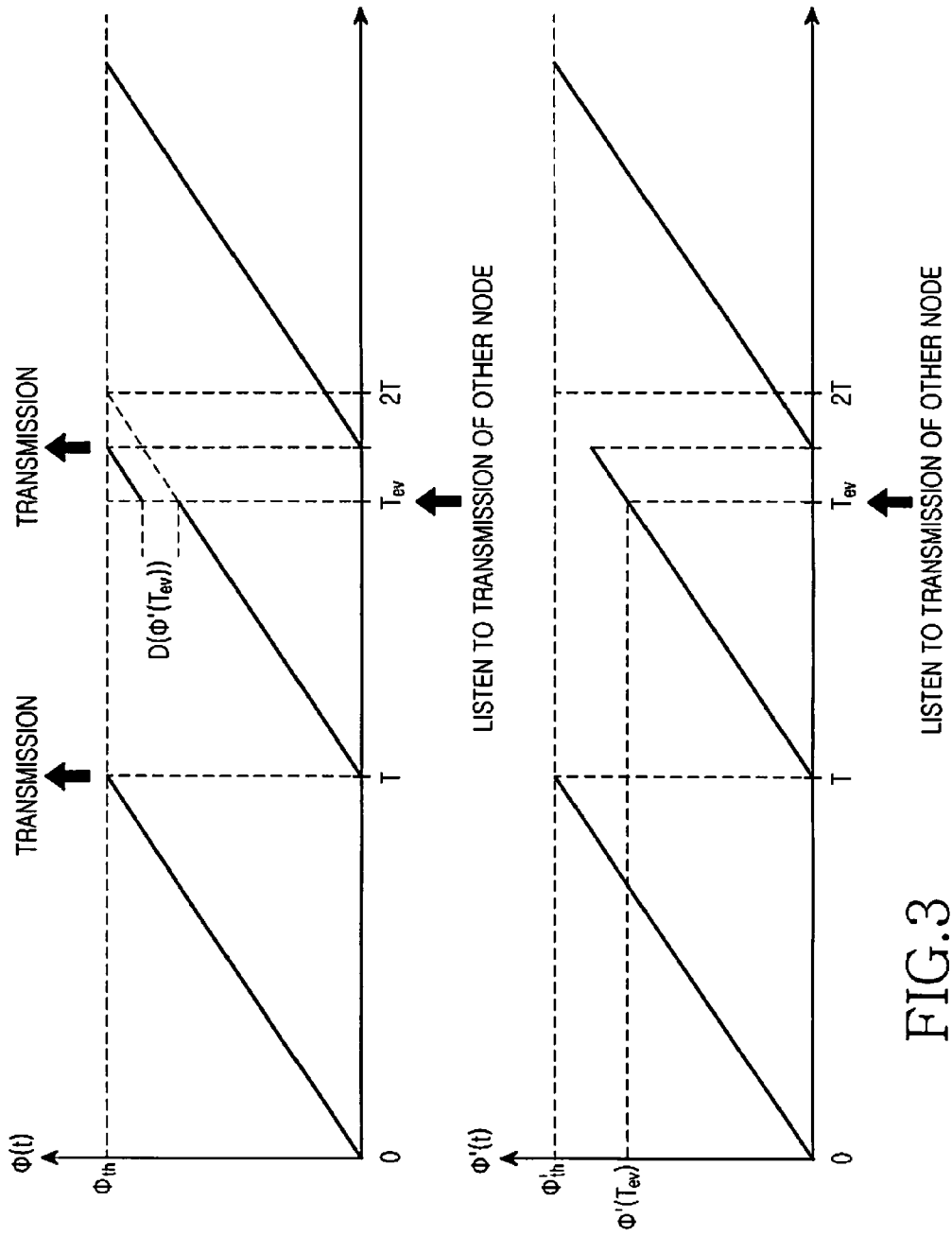
FIG. 3 is a graph illustrating phase control based on transmissions of other nodes, according to an embodiment of the present invention.

Referring now to FIG. 3, a graph illustrates phase control based on transmissions of other nodes, according to an embodiment of the present invention. Phase values $\Phi$ and $\Phi'$ can be calculated using two phase controllers. If a phase value calculated by a first phase controller is defined as $\Phi$ and a phase value calculated by a second controller is defined as $\Phi'$, phase values $\Phi(t)$ and $\Phi'(t)$ for a time t in the pertinent node increase incrementally as t increases, as illustrated in FIG. 3. If $\Phi(t)$ becomes equal to or greater than a threshold $\Phi_{th}$, the node performs transmission, and $\Phi(t)$ and $\Phi'(t)$ are re-initialized to zero (0). If the threshold $\Phi_{th}$ is assumed to be 1, $\Phi_{th}(t)$ increases from 0 to 1 over a period T. When no transmission is sensed (or listened to) external to the node, since the node carries out transmission every time $\Phi(t)=1$, the node performs periodic transmission at predetermined period T. FIG. 3 illustrates that in an interval between T and 2T, the phase is adjusted by $D(\Phi'(T_{ev}))$ as the node listens to transmissions of other nodes. $D(\Phi'(T_{ev}))$ is defined as a function of a phase value $D(\Phi'(T_{ev}))'(T_{ev})$ by the second phase controller at a time $T_{ev}$ when the node listened to transmissions of other nodes. Specifically, the phase value $\Phi$ of the first phase controller is a value updated by transmissions of other nodes, and the phase value $\Phi'$ of the second phase controller is a value that continuously increases at a predetermined increase rate and is initialized when the node performs transmission. In FIG. 3, it can be appreciated that the transmission period comes earlier as the phase value $\Phi$ increases by a predetermined number. $D(\Phi)$ may be a first- or higher-order function of $\Phi(t)$.

As shown in FIG. 3, in an embodiment of the present invention, upon listening to transmissions of other nodes, a certain node adjusts its phase $\Phi(t)$ based on values calculated in accordance with an algorithm for fairly dividing resources in an autonomous way. Though such self-organizing algorithms can be classified into several methods, an optimal algorithm is selected herein from those algorithms taking performance and utilization into account. The performance of the algorithm can be determined by a convergence speed indicating how fast the nodes start transmission at the same time intervals. The resource utilization depends on the amount of memory used in implementing the algorithm. In implementation, if the algorithm is designed to use the information only in the current state in order to adjust the phase $\Phi(t)$, it is possible to save resources such as memory, and reduce power consumption. While the method considered herein does not use memories for storing variables aside from the phase $\Phi(t)$, other algorithms may use additional memories.

Figure 4:
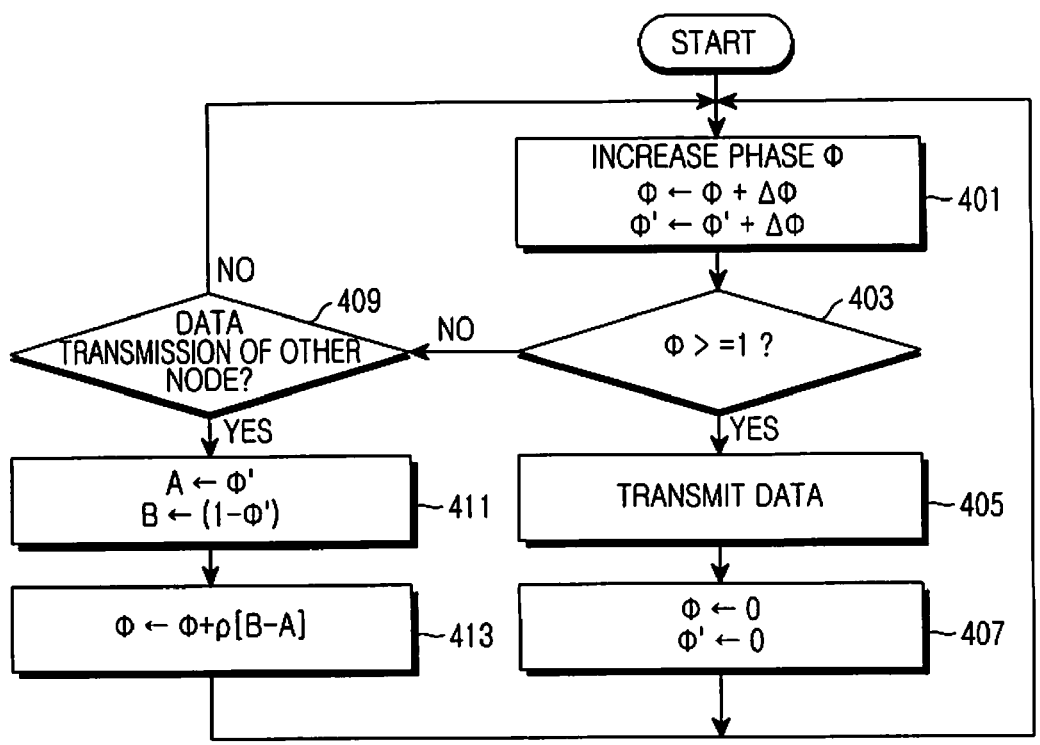
FIG. 4 is a flowchart illustrating a self-organizing resource allocation process, according to an embodiment of the present invention.

FIG. 4 is a flowchart illustrating a self-organizing resource allocation process, according to an embodiment of the present invention, in which a phase at the time a node performs transmission is defined as 1.

Referring to FIG. 4, in step 401, phase values $\Phi$ and $\Phi'$ of the node linearly increase from 0 to 1, as time t proceeds from 0 to T. In step 403, the node determines if $\Phi \geq 1$. If $\Phi \geq 1$, the node performs data transmission in step 405 and re-initializes both $\Phi$ and $\Phi'$ to 0 in step 407. Thereafter, the node returns to step 401.

However, if $\Phi<1$, the node determines, in step 409, whether a data transmission of another node is detected. If a data transmission from another node is not detected, the node returns to step 401. However, if the node a data transmission from another node is detected, the node defines the current phase value $\Phi'$ as A and $1-\Phi'$ as B in step 411, and derives values of A and B in step 413. The node updates the current phase value $\Phi$ as $\Phi+\rho(B-A)$, using the determined values of A and B. Though the current phase value $\Phi$ in step 413 may be represented as $\Phi+\rho(1-2\Phi')$, it is represented in two steps in order to indicate that the node adjusts the phase considering intervals between transmission time of the node and transmission times of the other nodes. After completion of the phase update in step 413, the node returns to step 401. The process above is repeated until data transmission is ended.

The above process may be expressed as $\Phi(t)=\Phi'(t)+\text{SUM}(D(\Phi'(t')))$, in which $D(\Phi'(t'))=\rho(1-2\Phi'(t'))$, and $\text{SUM}(D(\Phi'(t')))$ is a sum of all $D(\Phi'(t'))$ for listening times $t'=\{t_1, t_2, \ldots, t_{m-1}\}$ of transmissions of other nodes, which occur between the previous transmission and the next transmission. That is, $\Phi(t)$ has a deviation over the expected phase variation of $\Phi'(t)$ by $\text{SUM}(D(\Phi'(t')))$.

Figure 5:
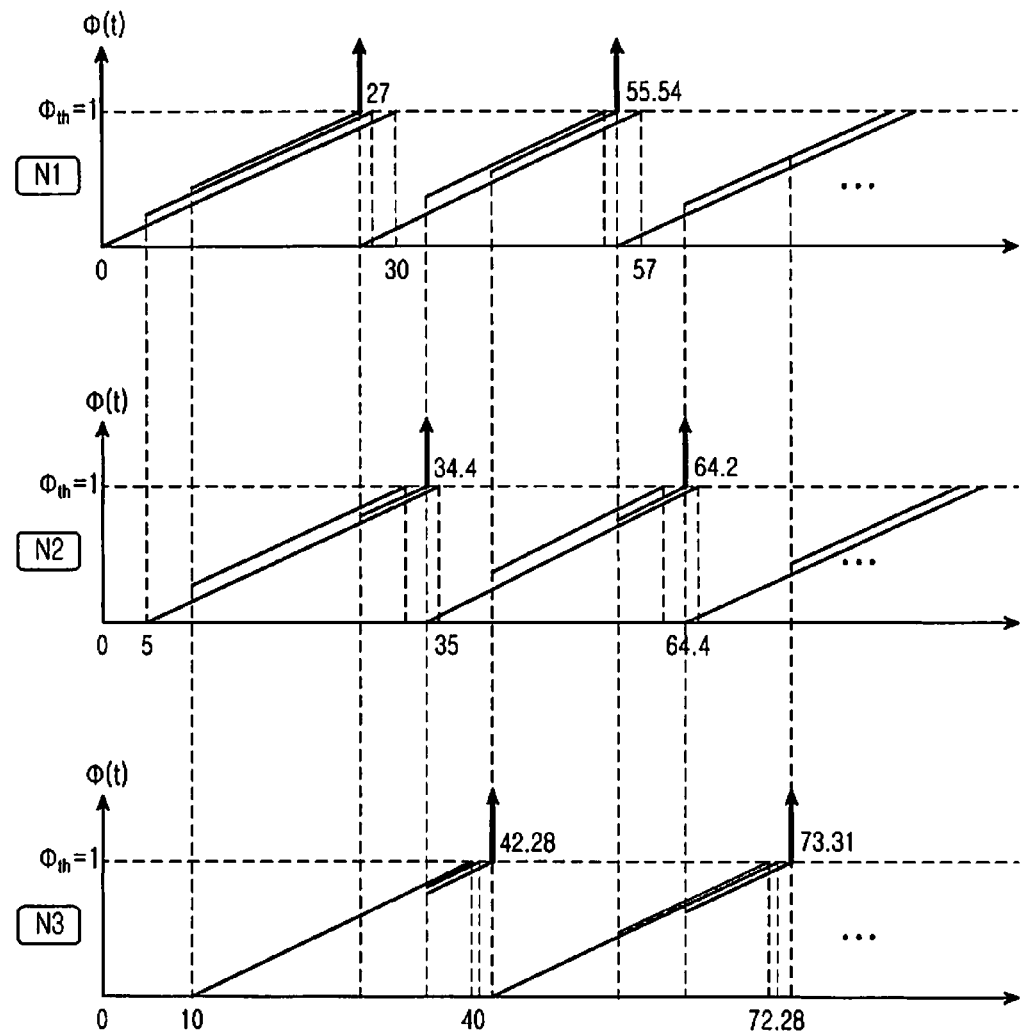
FIG. 5 is a graph illustrating a phase operation by a self-organizing algorithm for each node, according to an embodiment of the present invention.

For a better understanding of the flowchart in FIG. 4, an initial operation performed in the process of the flowchart is illustrated in FIG. 5. As described above, since a communication network is formed within a very short distance, such as BAN, it is assumed that each node is listening to, or monitoring, transmissions of other nodes.

Referring now to FIG. 5, a graph illustrates a phase operation by a self-organizing algorithm for each node, according to an embodiment of the present invention, in which three nodes are considered. All the three nodes are assumed to have a 30-msec period, and initial transmission times of the nodes are assumed to be 0 msec, 5 msec, and 10 msec. Since the period is T=30 msec, an increase rate of phase values $\Phi$ and $\Phi'$ is $\Delta=1/30$ for all the nodes. $\rho$ is given to adjust an update level of the phase value $\Phi$, and is set to 0.1 in an embodiment of the present invention.

In FIG. 5, a node 1 N1 starts operation at 0 msec, a node 2 N2 starts its transmission at 5 msec, and a node 3 N3 starts its transmission at 10 msec. A time difference between the N1 and the N2 is 5 msec at the time the N1 detects (listens to) transmission of the N2. At this time, in accordance with the flowchart of FIG. 4, A is calculated as $5\Delta=5/30$ and B is calculated as $25\Delta=25/30$ in the N1. Based on these values, a phase $\Phi$ is calculated as $\Phi'+\rho(25/30-5/30)$. Specifically, $\Phi$ is calculated and updated as $\Phi'+2/30$.

When the N1 detects transmission of the N3, a time difference between the N1 and the N3 is 10 msec. Therefore, in accordance with FIG. 4, A is calculated as $10\Delta=10/30$ and B is calculated as $20\Delta=20/30$ in the N1. Based on these values, a phase $\Phi$ is calculated and updated as $\Phi'+2/30+\rho(20/30-10/30)$ using the phase value updated when transmission of the N2 is listened to. Specifically, $\Phi$ is calculated and updated as $\Phi'+3/30$.

Transmission of the N1 will take place again. The phase value of the N1 has been updated as $\Phi'+3/30$, by listening to transmissions of other nodes. The updated phase value is increased by 3/30 compared with the phase value that would be determined when it is not affected by transmissions of other nodes. Therefore, the original one-period transmission time has been changed from 30 msec to 27 msec. It is noted that if such a process is repeated with respect to each node, transmission time intervals among the respective nodes become equal as time passes.

The N2 first listens to the N3, and then listens to the N1 after a lapse of one period. The N3 listens to the N1 after a lapse of one period, and then listens to the N2. Calculations made by the N2 and the N3 are equal to the calculation made by the N1, and are summarized in Table 1 below.

TABLE 1

| Period | Node 1 | Node 2 | Node 3 |
|---|---|---|---|
| 1 | 0 | 5 | 10 |
| 2 | 27 | 34.4 | 42.28 |
| 3 | 55.536 | 64.203 | 73.316 |
| 4 | 84.825 | 94.150 | 103.785 |

As shown in Table 1, in the environment where 3 nodes are considered, tracing results of the transmission times can be determined as described in FIG. 4 on the assumption that the total common period is 30 msec, the N1 starts operation at 0 msec, the N2 starts transmission at 5 msec and the N3 starts transmission at 10 msec. The unit of numbers in Table 1 is msec. Based on Table 1, transmission time intervals between nodes can be expressed in numerical values as shown in Table 2 below.

TABLE 2

| Period | Node 1 – Node 2 | Node 2 – Node 3 | Node 3 – Node 1 |
|---|---|---|---|
| 1 | 5 | 5 | 17 |
| 2 | 7.4 | 7.88 | 13.256 |
| 3 | 8.667 | 9.113 | 11.509 |
| 4 | 9.325 | 9.635 | 10.698 |

It is noted from Table 2 that differences in transmission time interval among nodes decrease as the period increases. This uniform division is possible because the resource allocation is performed in the same manner despite an increase in the number of nodes.

Figure 6:
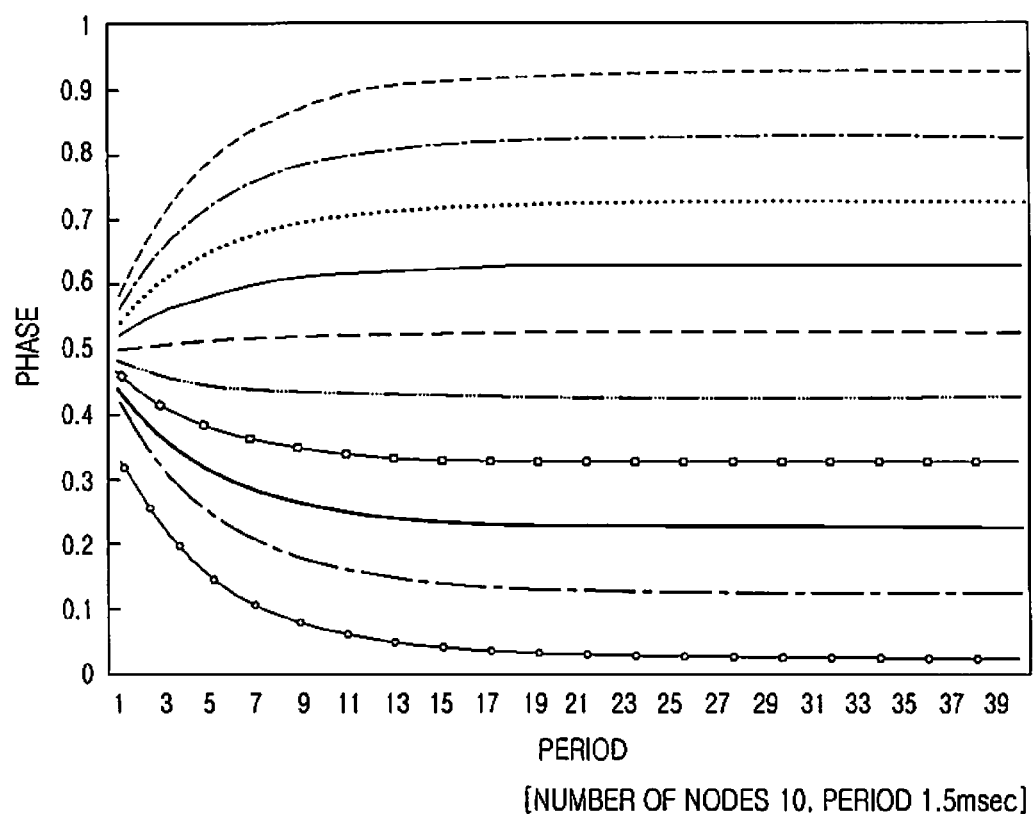
FIG. 6 is a graph illustrating a phase operation based on the number of periods, according to an embodiment of the present invention.

FIG. 6 is a graph illustrating a phase operation based on the number of periods, according to an embodiment of the present invention. Simulation is carried out in accordance with the number of periods, assuming that the number of nodes is 10 and a time of a period is 1.5 msec.

In FIG. 6, from the 15$^{th}$ period on, the phase error falls below 0.01. The algorithm has an error of 15 μsec on a time basis, and shows superior performance given that a time sync error goal of the common sensor network is several tens of μsec. In addition, since control signals for time sync and control signals for resource allocation are unused, the actual available data transmission performance is superior.

Although the algorithm provided by the present invention can achieve a power reduction effect by reducing access delay or resource allocation information, all nodes in this algorithm always maintain the listening state to detect transmissions/non-transmissions of other nodes at a time other than their transmission times. This causes additional power consumption. To deal with the power consumption, an embodiment of the present invention provides a method of achieving a significant power reduction effect by reducing the listening state to a greatest extent possible without performance degradation.

Figure 7:
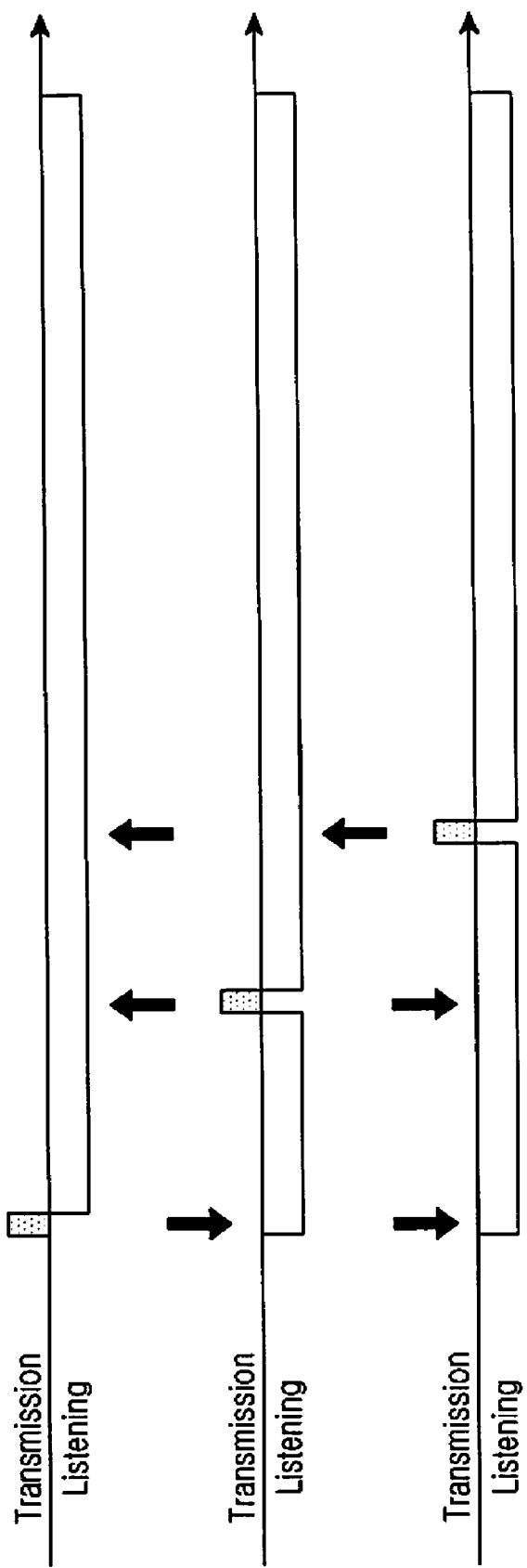
FIG. 7 is a graph illustrating a self-organizing resource access algorithm, according to an embodiment of the present invention.

Referring now to FIG. 7, a diagram illustrates an operation of the self-organizing resource access algorithm, according to an embodiment of the present invention. All time intervals other than the transmission intervals are set as listening intervals. Each node controls phase values upon listening to transmissions/non-transmissions of other nodes while always maintaining the listening state, in order to ensure the desired regular-interval resource access. If the early self-organizing resource access algorithm is applied to systems in which the required power is high in the listening state, significant power consumption is expected.

Figure 8:
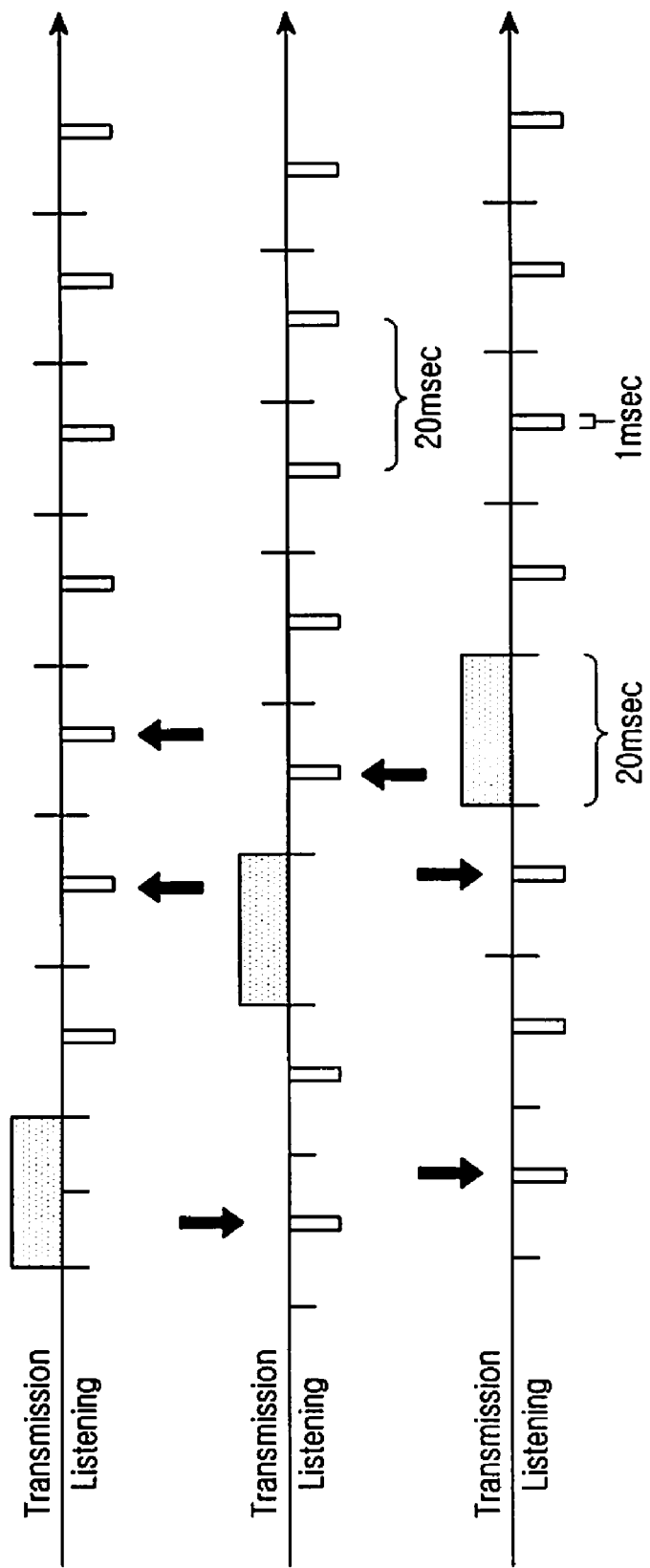
FIG. 8 is a graph illustrating a slot-based self-organizing resource access algorithm, according to an embodiment of the present invention.
Figure 9:
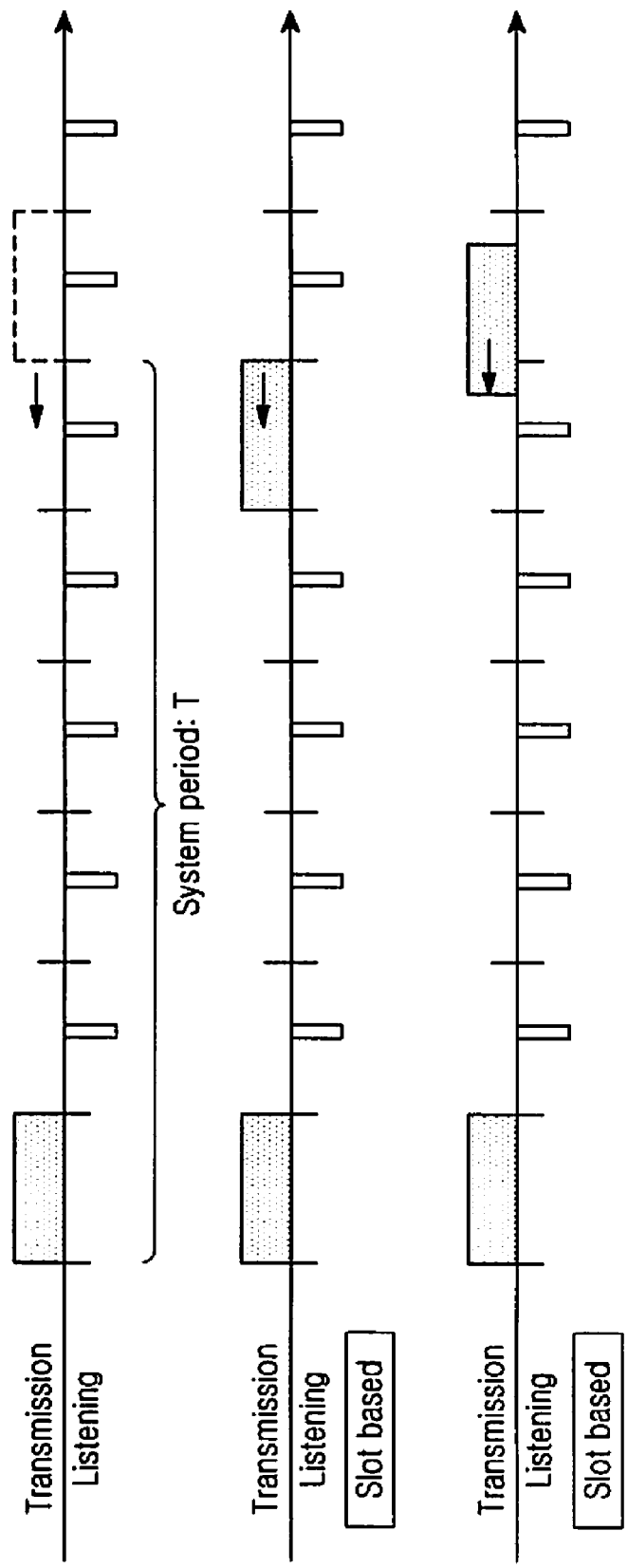
FIG. 9 is a graph illustrating problems of a slot-based self-organizing resource access algorithm and hybrid slot-based self-organizing resource access algorithms, according to an embodiment of the present invention.

In order to solve these problems, an embodiment of the present invention provides a new scheme of performing listening over one short interval on a slot basis. The listening interval is repeated on a slot time length basis. In order to increase listening possibility to 100%, each node occupies as much resource as a slot length during transmission. FIG. 8 is a diagram illustrating a basic operation of such a slot-based self-organizing resource access algorithm, according to an embodiment of the present invention. Since a slot time is 20 msec and a listening time is 1 msec, each node consumes a power of about ½0 in each slot. However, as shown in FIG. 9, in the slot-based algorithm, the desired fine control for transmission at a specific slot is difficult. If the transmission time is precisely controlled and a listening period is changed according to a change in the transmission time, fair listening chances cannot be offered over the time period. Therefore, a hybrid algorithm on the lower part of FIG. 9 is provided, according to an embodiment of the present invention, in which each node finely controls the transmission time in a continuous way and performs periodic listening without a mid-course change in listening period, as it was determined when the node first joined the system.

Figure 10:
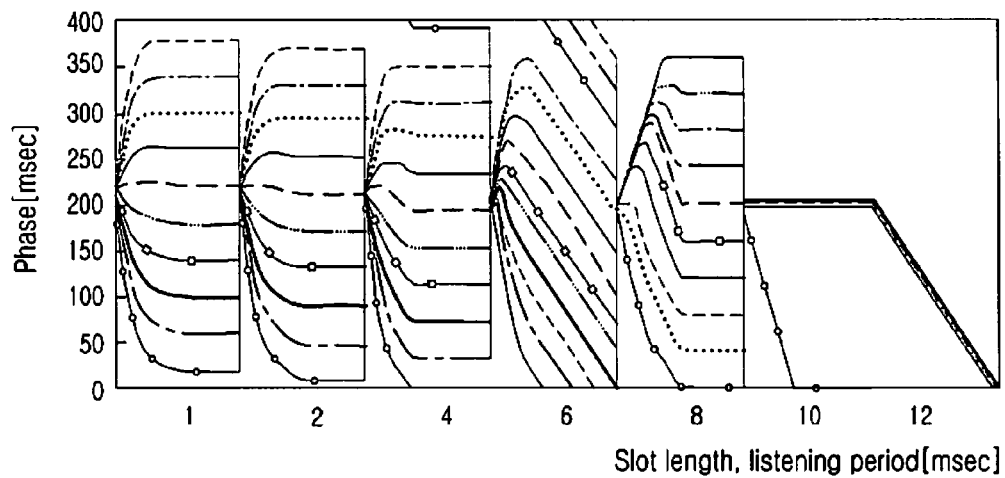
FIG. 10 is a graph illustrating performance of a slot-based self-organizing resource access algorithm, according to an embodiment of the present invention.
Figure 11:
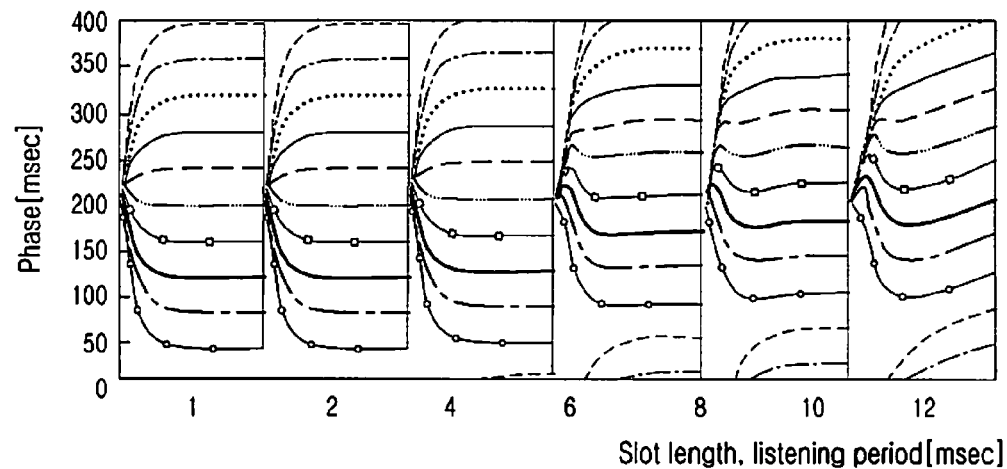
FIG. 11 is a graph illustrating performance of a hybrid self-organizing resource access algorithm, according to an embodiment of the present invention.

Referring now to FIG. 10 illustrates performance of a slot-based self-organizing resource access algorithm, according to an embodiment of the present invention. All of 10 nodes have a 400-msec system period and a slot time interval or listening period on the horizontal axis increases from 1 msec to 12 msec. As the slot time interval exceeds 4 msec, all nodes show drifting without securing periodicity in the time axis, and then after 10 msec, they fail to perform normal operations, with their transmission times overlapping each other. On the other hand, FIG. 11 illustrates performance of a hybrid self-organizing resource access algorithm, according to an embodiment of the present invention. Stability is secured even after 10 msec. However, the nodes still show drifting because there is a difference between the listening time and the actual transmission time even in the hybrid algorithm.

Figure 12:
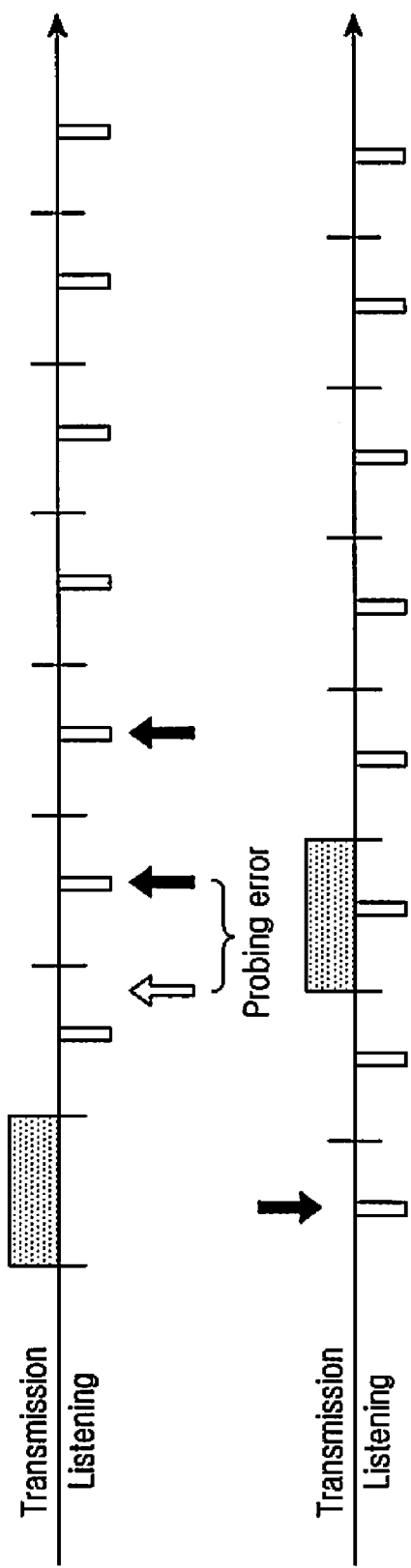
FIG. 12 is a graph illustrating a transmission time listening error due to periodic listening in a node, according to an embodiment of the present invention.

FIG. 12 is a diagram illustrating a situation in which a listening error on transmission time occurs. Due to the fact that each node periodically wakes up to listen without always maintaining the listening state, an error that is smaller than a slot time interval may occur between the actual transmission time and the time it listens to the transmission, as shown in FIG. 12. This error affects the operation of the algorithm, making it difficult to attain the desired goal. In order to address these problems, a sub-listening algorithm is provided to detect the accurate transmission time despite slight power consumption.

Figure 13:
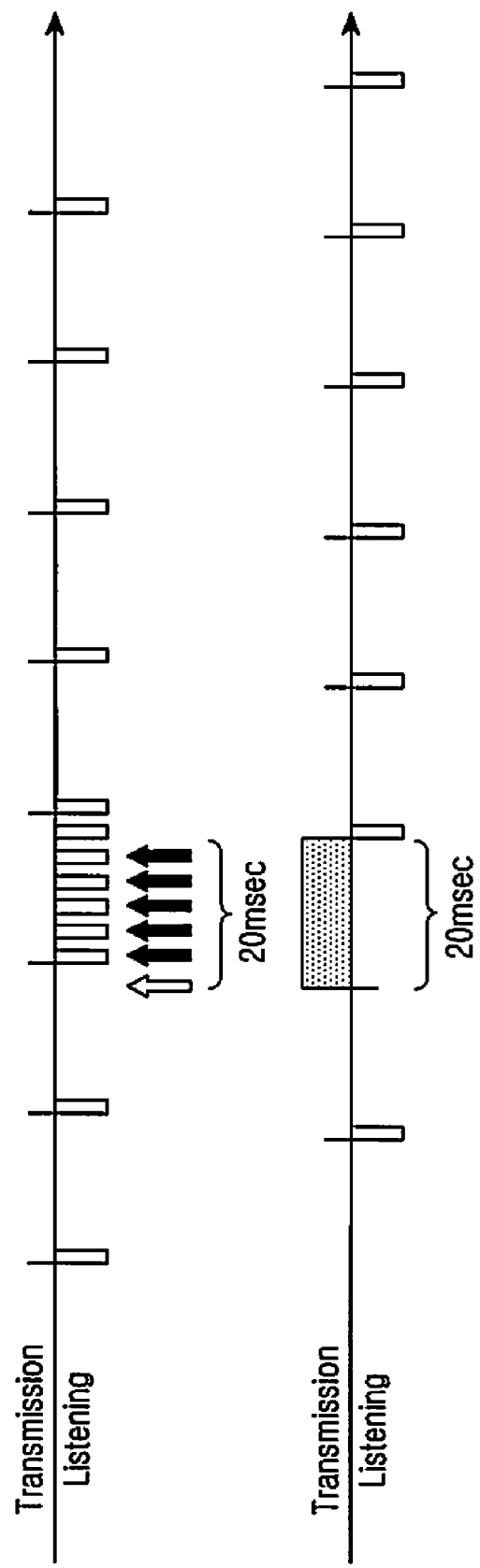
FIG. 13 is a graph illustrating an algorithm to which sub-listening is applied to minimize listening errors, according to an embodiment of the present invention.

Referring now to FIG. 13, a diagram illustrates an approximate operation of a sub-listening algorithm, according to an embodiment of the present invention. Each node attempts to listens to transmissions/non-transmissions of other nodes at the beginning of a slot. Upon listening to transmissions of other nodes, the node makes additional listening attempts at regular intervals within a slot time interval in the slot. In this embodiment of the present invention, if an inter-sub-listening interval is defined as 3.333 msec, the node makes 5 additional listening attempts in the slot, performing a total of 6 sub-listening attempts. The number of attempts is given herein by way of example only, to improve the accuracy.

Figure 14:
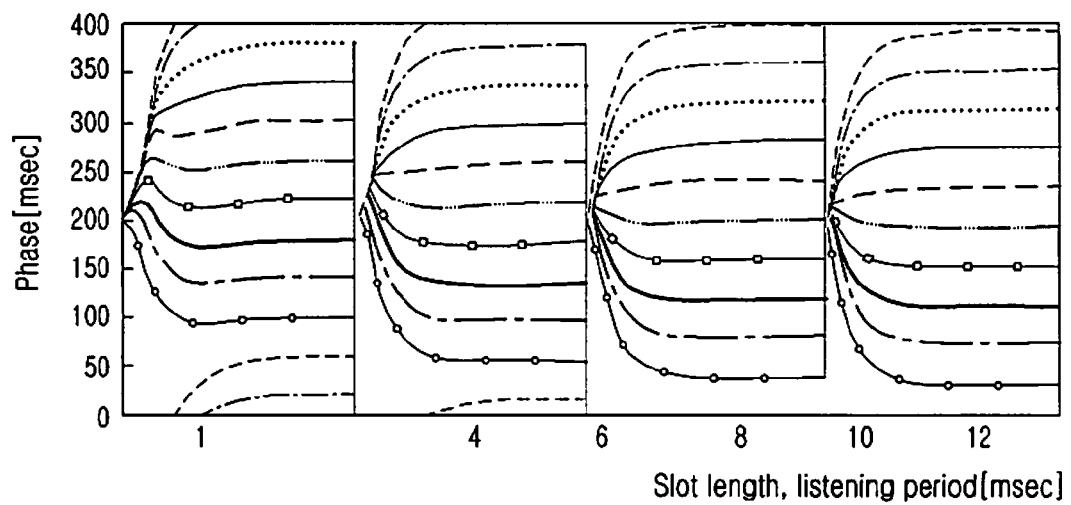
FIG. 14 is a graph illustrating performance improved by a sub-listening algorithm, according to an embodiment of the present invention.

In FIG. 14, due to the addition of the sub-listening algorithm, the performance is improved with the number of sub-listenings. It is noted that in a situation where a slot time interval is 10 msec and 10 nodes join the system, the nodes show normal operations when the number of sub-listenings within one slot is 5 or more.

The embodiments of the present invention are devised to achieve the desired objectives while minimizing power consumption, by adding the sub-listening algorithm to the hybrid algorithm. This method is called a "self-organizing resource access algorithm for ultra-low power." A logical diagram for the method is shown in FIG. 15, and variables used therein are defined as follows:

$\Phi$: A phase value calculated by a first phase controller, $\Phi'$: A phase value calculated by a second phase controller, $\Phi_{slot}$: A phase variation corresponding to a slot time interval, $T_{sub}$: A timer that is set to 0 at the beginning of a slot and increases with time, and $D_{sub}$: A time value defined as (slot time interval)/(number of sub-listenings within one slot).

Figure 15:
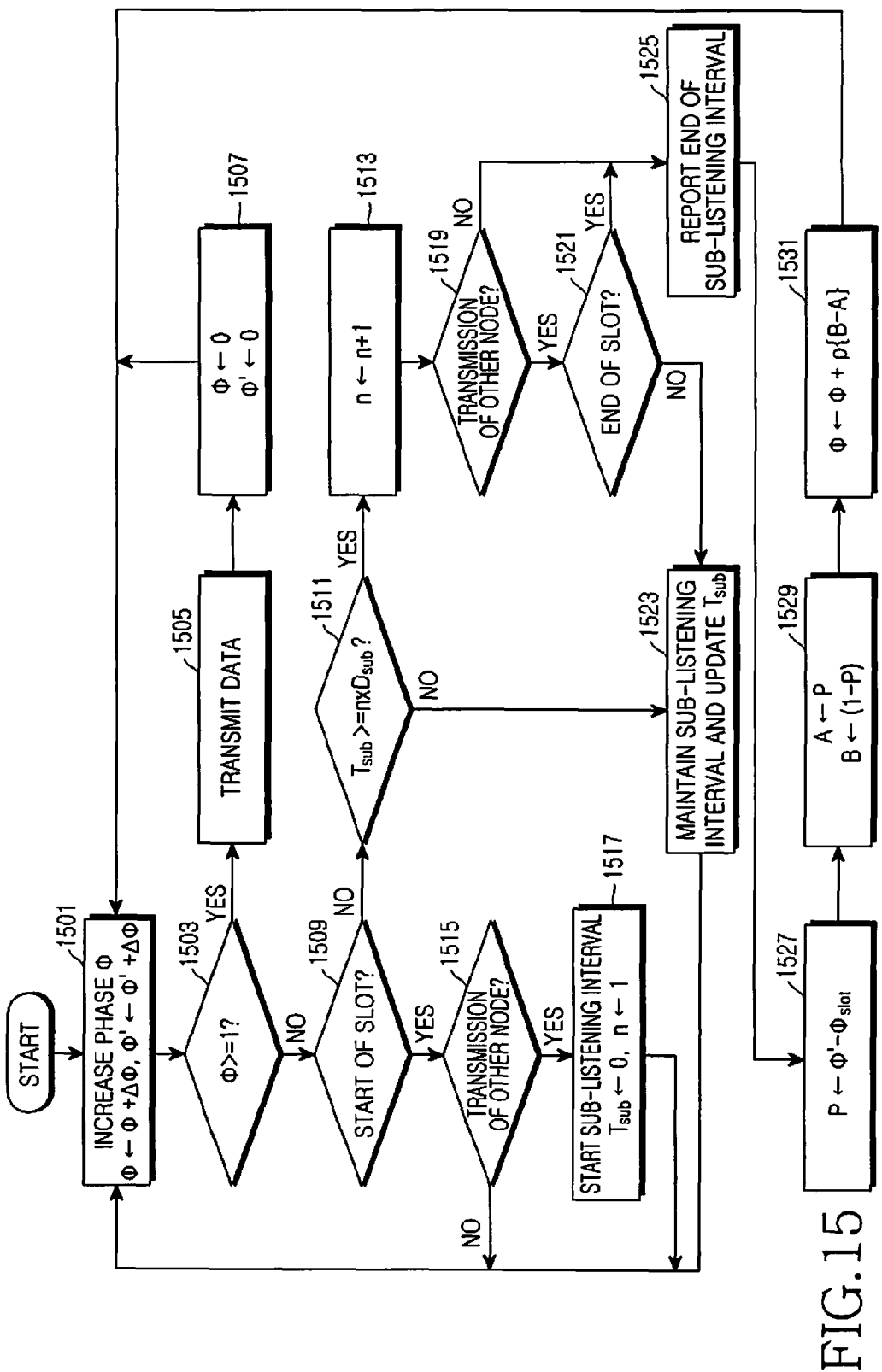
FIG. 15 is a flowchart illustrating a self-organizing resource access algorithm for ultra-low power, according to an embodiment of the present invention.

Referring to FIG. 15, in step 1501, phase values $\Phi'$ and $\Phi'$ of a pertinent node both linearly increase from 0 to 1, as time t proceeds from 0 to T. In step 1503, the node determines if $\Phi \geq 1$. If $\Phi \geq 1$, the node performs data transmission in step 1505, and re-initializes both of $\Phi$ and $\Phi'$ to 0 in step 1507. Thereafter, the node returns to step 1501.

However, if $\Phi<1$, the node determines in step 1509 whether the current time is a start of a slot. If the slot starts in step 1509, the node determines in step 1515 whether a transmission of another node is detected. If a transmission of another node is not detected, the node returns to step 1501. However, if a transmission of another node is detected, the node sets $T_{sub}$ to 0 and n to 1, starting a sub-listening interval, in step 1517, and then returns to step 1501.

If the slot has not started in step 1509, the node determines in step 1511 whether $T_{sub} \geq n*D_{sub}$. If $T_{sub} < n*D_{sub}$, the node updates $T_{sub}$ while maintaining the sub-listening interval, in step 1523. If $T_{sub} \geq n*D_{sub}$, the node increases n by 1 in step 1513, and determines in step 1519 whether a transmission of another node is detected. Here, n may be defined as a counter value that increases with the number of sub-listening attempts. Upon detecting a transmission of another node, the node determines in step 1521 whether the slot ends. If the slot has not ended, the node updates $T_{sub}$ while maintaining the sub-listening interval, in step 1523. If a transmission from another node is not detected in step 1519, or if the slot has ended in step 1521, the node reports an end of the sub-listening interval in step 1525.

The node calculates P in step 1527, and then calculates A and B using the P in step 1529. In step 1531, the node updates the current phase value $\Phi$ as $\Phi+\rho(B-A)$ using the A and B, and then returns to step 1501. The process above is repeated until data transmission is completed.

Figure 16:
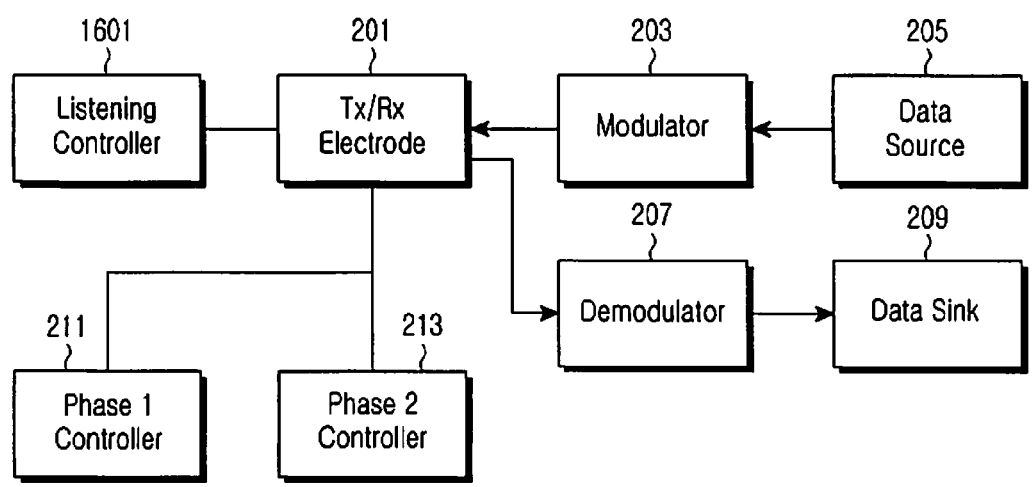
FIG. 16 is a block diagram illustrating implementation of self-organizing resource allocation in LAN communications, according to an embodiment of the present invention.

To implement the self-organizing resource access algorithm for ultra-low power, a listening controller 1601 needs to be added to the block diagram in FIG. 2, as illustrated in FIG. 16.

Performance of the self-organizing resource access algorithm for ultra-low power has been described so far in a specific experimental environment where a period is 400 msec, a listening time is 1 msec, transmission power consumption is 33 mW, listening power consumption is 30 mW, and the number of joining nodes is 10. It can be seen in Table 3 that compared with the algorithm of the first embodiment, the sub-listening added algorithm of the improved embodiment of the present invention shows power reduction of at least 77.5% while having the same operation performance.

TABLE 3

|  | System (1st embodiment) | Sub-listening added system | | | |
|---|---|---|---|---|---|
| Slot length | — | 10 | 10 | 10 | 10 |
| Sub-listening | — | 1 | 3 | 5 | 10 |
| Power consumption | 30.0075 | 3.75 | 5.1 | 6.45 | 9.825 |

Figure 17A:
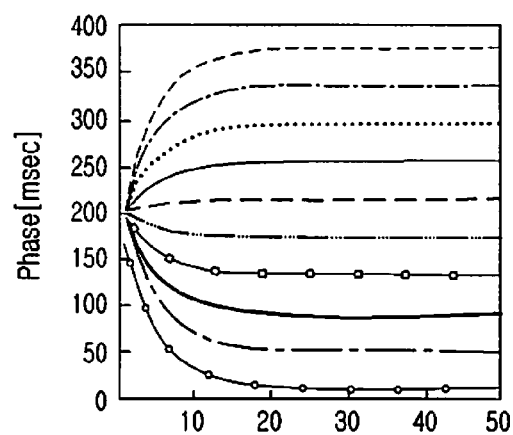
FIGS. 17A and 17B are graphs illustrating performances of a self-organizing resource access algorithm for ultra-low power, according to an embodiment of the present invention.
Figure 17B:
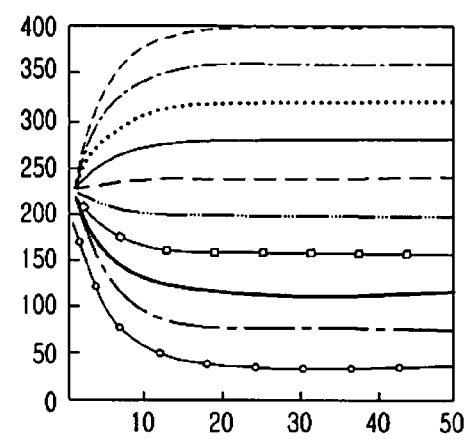

A graph corresponding to the system of the first embodiment of the present invention and a graph corresponding to the sub-listening added system in Table 3 are illustrated in FIGS. 17A and 17B, respectively. As is shown in FIGS. 17A and 17B, when compared with the system of the first embodiment of the present invention, the sub-listening added system shows significant power reduction.

As is apparent from the foregoing description, embodiments of the present invention define operation rules of respective nodes in accordance with the self-organizing principle and provides a resource access method based on the rules in a LAN communication system such as Human Body Communication (HBC), thereby reducing resource allocation loads and ensuring adaptation to an increase in the number of nodes to minimize collision.

While the present invention has been shown and described with reference to certain embodiments of the present invention, it will be understood by those skilled in the art that various changes in form and detail may be made therein without departing from the spirit and scope of the invention as defined by the appended claims and their equivalents.

What is claimed is:

1. A self-organizing resource access method for transmitting data by self-organizing resource access by each individual node in a Local Area Network (LAN) communication environment where at least two nodes exchange data with each other, the method comprising the steps of:
   listening to, by a first node, at least one data transmission of at least one other node connected to the LAN; and
   adjusting, by the first node, a data transmission start time of the first node in accordance with a data transmission start time of the at least one other node so that the data transmission start time of the first node does not overlap the data transmission start time of the at least one other node;
   wherein the first node transmits data to the at least one other node at the adjusted data transmission start time,
   wherein the data transmission start time of the first node is adjusted by the first node using first and second phase controllers provided within the first node, and
   wherein the first phase controller controls the data transmission start time of the first node to transmit the data at the controlled data transmission start time, and the second phase controller controls a phase that continuously increases at a predetermined rate until data transmission of the first node occurs.

2. The self-organizing resource access method of claim 1, wherein the at least two nodes have a same data transmission period.

3. The self-organizing resource access method of claim 1, wherein the data transmission start time of the first node is adjusted within a data transmission period of the first node.

4. The self-organizing resource access method of claim 1, wherein the data transmission start time of the first node is adjusted by controlling a phase of a data transmission period of the first node.

5. The self-organizing resource access method of claim 1, wherein listening to at least one data transmission comprises:

listening to the at least one data transmission of the at least one other node until the data transmission start time of the first node; and updating the data transmission start time of the first node upon listening to the at least one data transmission of the at least one other node until the data transmission start time.

6. The self-organizing resource access method of claim 1, wherein the first node listens to the at least one data transmission of the at least one other node without a control signal for time synchronization and resource allocation.

7. The self-organizing resource access method of claim 1, wherein adjusting a data transmission start time of the first node comprises:

analyzing a data transmission time interval between the data transmission start time of the first node and the data transmission start time of the at least one other node; and updating the data transmission start time of the first node based on the analyzed data transmission time interval.

8. The self-organizing resource access method of claim 1, wherein, in adjusting the data transmission start time of the first node, a data transmission time interval among all nodes included in the LAN is uniformly divided and converged within a time period.

9. The self-organizing resource access method of claim 1, wherein the first node sets a periodic listening time and listens to the at least one data transmission of the at least one other node in the periodic listening time.

10. The self-organizing resource access method of claim 7, wherein upon listening to the at least one data transmission of the at least one other node, the first node makes additional listening attempts at preset time intervals until the at least one data transmission of the at least one other node is completed, when at least one data transmission time of the at least one other node is longer than the periodic listening time.

11. A self-organizing resource access apparatus for transmitting data by self-organizing resource access by each individual node in a Local Area Network (LAN) communication environment where at least two nodes exchange data with each other, the apparatus comprising:

an input/output unit for transmitting and receiving data;

a modulator for converting data to be sent into a transmittable signal;

a demodulator for converting a received signal into receivable data; and a phase control unit for controlling a first node to listen to at least one data transmission of at least one other node connected to the LAN, and adjust a data transmission start time of the first node in accordance with a data transmission start time of the at least one other node so that the data transmission start time of the first node does not overlap the data transmission start time of the at least one other node;

wherein the phase control unit transmits the data to be sent to the at least one other node through the input/output unit at the adjusted data transmission start time, and wherein the phase control unit comprises:

a first phase controller for controlling the data transmission start time of the first node to transmit the data at the controlled data transmission start time; and a second phase controller for controlling a phase that continuously increases at a predetermined rate until data transmission of the first node occurs, wherein the first and second phase controllers are provided within the first node.

12. The self-organizing resource access apparatus of claim 11, wherein the phase control unit adjusts a phase of the data transmission start time of the first node in adjusting the data transmission start time of the first node so that the data transmission start time of the first node does not overlap the data transmission start time of the at least one other node.

13. The self-organizing resource access apparatus of claim 11, wherein the phase control unit listens to the at least one data transmission of the at least one other node until the data transmission start time of the first node, and newly updates the data transmission start time of the first node upon listening to the at least one data transmission of the at least one other node until the data transmission start time.

14. The self-organizing resource access apparatus of claim 11, wherein the first node listens to the at least one data transmission of the at least one other node without a control signal for time synchronization and resource allocation.

15. The self-organizing resource access apparatus of claim 11, wherein the phase control unit analyzes a data transmission time interval between the data transmission start time of the first node and the data transmission start time of the at least one other node, and updates the data transmission start time of the first node based on the analyzed data transmission time interval.

16. The self-organizing resource access apparatus of claim 11, wherein the phase control unit controls a data transmission time interval among all nodes included in the LAN to be uniformly divided and converged within a time period.

17. The self-organizing resource access apparatus of claim 11, wherein the first node sets a periodic listening time and listens to the at least one data transmission of the at least one other node in the periodic listening time.

18. The self-organizing resource access apparatus of claim 11, wherein upon listening to the at least one data transmission of the at least one other node, the first node makes additional listening attempts at preset time intervals until the at least one data transmission of the at least one other node is completed, when at least one data transmission time of the at least one other node is longer than the periodic listening time.

19. A self-organizing resource access system for transmitting data by self-organizing resource access by each individual node in a Local Area Network (LAN) communication environment where at least two nodes exchange data with each other, the system comprising:

at least one first node for listening to at least one data transmission of at least one second node that entered the LAN, and adjusting a data transmission start time of the at least one first node in accordance with on a data transmission start time of the at least one second node; and the at least one second node for listening to at least one data transmission of the at least one first node and adjusting the data transmission start time of the at least one second node in accordance with the data transmission start time of the at least one first node, wherein the first node comprises:

a first phase controller for controlling the data transmission start time of the first node to transmit the data at the controlled data transmission start time; and a second phase controller for controlling a phase that continuously increases at a predetermined rate until data transmission of the first node occurs.

* * * * *